US009143232B2

(12) United States Patent
Bhide

(10) Patent No.: US 9,143,232 B2
(45) Date of Patent: Sep. 22, 2015

(54) TRACKABLE WIRELESS OPTICAL COMMUNICATION

(75) Inventor: Sandhiprakash J. Bhide, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 13/997,984

(22) PCT Filed: Mar. 29, 2012

(86) PCT No.: PCT/US2012/031294
§ 371 (c)(1),
(2), (4) Date: Jun. 25, 2013

(87) PCT Pub. No.: WO2013/147809
PCT Pub. Date: Oct. 3, 2013

(65) Prior Publication Data
US 2014/0328597 A1   Nov. 6, 2014

(51) Int. Cl.
*H04B 10/112* (2013.01)
*H04B 10/00* (2013.01)
(52) U.S. Cl.
CPC .......... *H04B 10/112* (2013.01); *H04B 10/1121* (2013.01)
(58) Field of Classification Search
CPC .. H04B 10/112; H04B 10/11; H04B 10/1123; H04B 10/1125
USPC ......................................... 398/115, 116, 118
See application file for complete search history.

(56) References Cited

U.S. PATENT DOCUMENTS

| 7,058,307 | B2   |   | 6/2006  | Sakanaka |
|-----------|------|---|---------|----------|
| 7,133,617 | B2   | * | 11/2006 | Oettinger et al. ............. 398/123 |
| 7,133,618 | B2   | * | 11/2006 | Oettinger ...................... 398/129 |
| 2002/0081060 | A1 |   | 6/2002  | Margalit et al. |
| 2004/0202407 | A1 |   | 10/2004 | Hoke |
| 2004/0208630 | A1 | * | 10/2004 | Oettinger et al. ............. 398/167 |
| 2004/0258415 | A1 | * | 12/2004 | Boone et al. .................. 398/125 |
| 2005/0058392 | A1 |   | 3/2005  | Qian et al. |
| 2008/0044188 | A1 | * | 2/2008  | Kagawa et al. ............... 398/128 |
| 2008/0238893 | A1 | * | 10/2008 | Ishii ............................... 345/204 |
| 2009/0263138 | A1 | * | 10/2009 | Pelley et al. .................. 398/131 |
| 2014/0328597 | A1 | * | 11/2014 | Bhide ............................ 398/118 |

OTHER PUBLICATIONS

International Search Report and Written Opinion for PCT/US2012/031294, mailed Nov. 20, 2012, 8 pages.
International Preliminary Report on Patentability for PCT Application No. PCT/US2012/031294, Mailed Oct. 9, 2014, 8 Pages.

* cited by examiner

*Primary Examiner* — Oommen Jacob
(74) *Attorney, Agent, or Firm* — Schwabe Williamson & Wyatt PC

(57) ABSTRACT

Embodiments provide a first communications device configured to communicate with one or more other communications devices over a wireless optical link. The first communications device may include a first communications structure configured to communicate with a second communications structure via the wireless optical link. The communications device may further include a micro-electro-mechanical systems (MEMS) mirror configured to direct an optical data signal sent over the wireless optical link and a controller configured to move the MEMS mirror based on feedback information to maintain the optical link between the first communications structure and the second communications structure.

25 Claims, 5 Drawing Sheets

TRACKABLE WIRELESS OPTICAL COMMUNICATION

CROSS REFERENCE TO RELATED APPLICATION

The present application is a national phase entry under 35 U.S.C. §371 of International Application No. PCT/US2012/031294, filed Mar. 29, 2012, entitled "TRACKABLE WIRELESS OPTICAL COMMUNICATION," which designates, among the various States, the United States of America, and the entire contents and disclosures of which are hereby incorporated by reference in their entireties.

TECHNICAL FIELD

Embodiments of the present disclosure relate generally to wireless communications and more specifically to trackable wireless optical communication.

BACKGROUND

In many wireless communication networks, large amounts of data, such as information, files, and/or media (e.g., pictures, audio, and video, must be transferred between devices. In some cases, this data needs be transferred between subsystems or between components of a given subsystem. Current systems use radio frequency (RF) communications (e.g., Bluetooth, WiFi, and/or Cellular communications) or a physical link such as Ethernet or optical fiber to transfer data between devices. However, the RF band is regulated and provides a limited amount of bandwidth. Furthermore, RF communication sends energy in all directions, thereby providing low security, low efficiency, and a source of electromagnetic interference (EMI).

BRIEF DESCRIPTION OF THE DRAWINGS

Embodiments of the present disclosure will be described by way of example embodiments, but not limitations, illustrated in the accompanying drawings in which like references denote similar elements, and in which.

DETAILED DESCRIPTION

Figure 1:
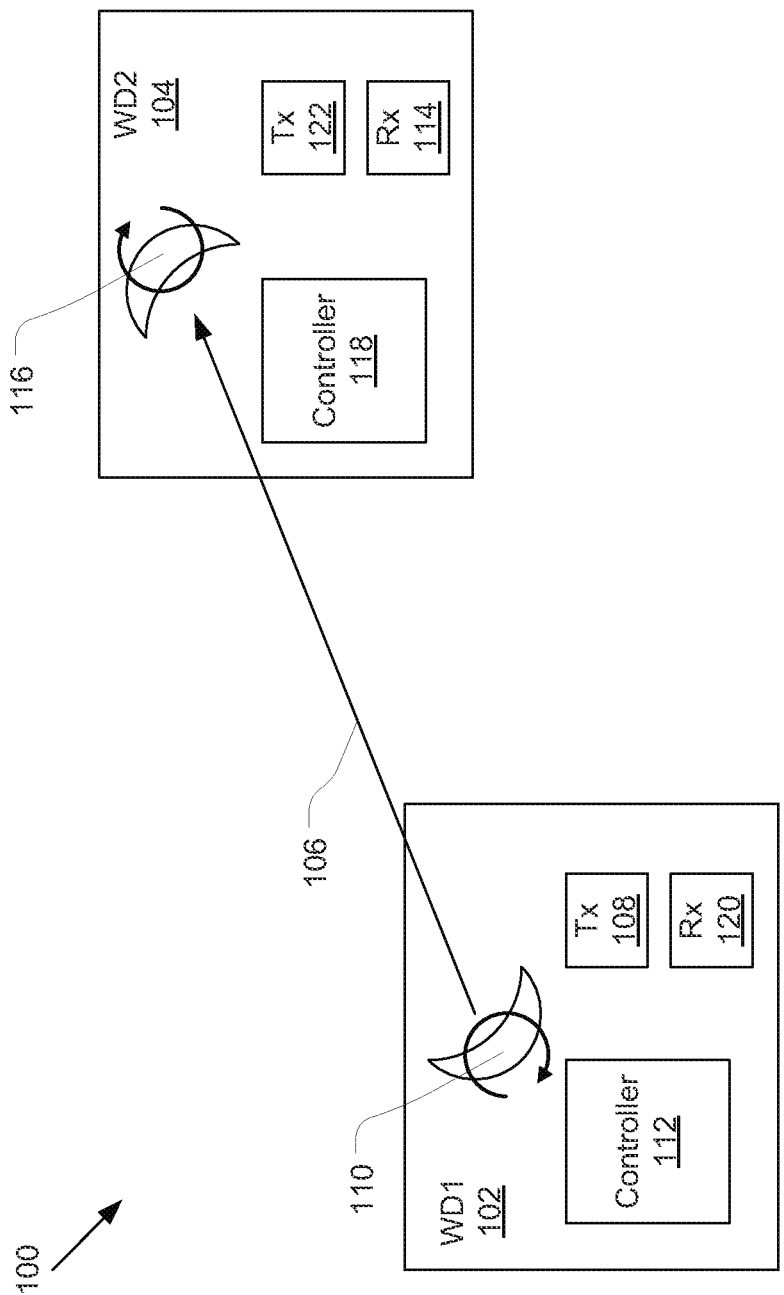
FIG. 1 illustrates a wireless communication system in which a first wireless communication device is configured to communicate with a second wireless communication device over a wireless optical link in accordance with various embodiments.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Moreover, methods within the scope of this disclosure may include more or fewer steps than those described.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Various embodiments may provide a trackable wireless optical communication system for devices to communicate with one another over a wireless optical link even if one or both devices are moving.

Various embodiments may provide a communications device including a first communications structure configured to communicate with a second communications structure via a wireless optical link. The communications device may further include a micro-electro-mechanical systems (MEMS) mirror configured to direct an optical data signal sent over the wireless optical link and a controller configured to move the MEMS mirror based on feedback information to maintain the optical link between the first communications structure and the second communications structure.

The communications structure may include a transmitter (e.g., an optoelectronic modulator such as a light emitting diode (LED) and/or a tunable laser) and/or a receiver (e.g., an optoelectronic demodulator such as a photodiode).

In one embodiment, the optical data signals may be routed via a relay device. The relay device may include a mirror configured to receive an optical data signal from a transmitter of a first communications device and direct the optical data signal to a receiver of a second communications device to form the wireless optical link between the first and second communications devices. A controller may be coupled to the mirror and configured to move the mirror in response to feedback information to maintain the wireless optical link.

The term "optical wireless device" is used to facilitate discussion. In some embodiments, the optical wireless devices may be different subsystems and/or components of the same device.

FIG. 1 illustrates a wireless communication system 100 including a first wireless communications device (WD1) 102 and a second wireless communications device (WD2) 104 configured to communicate optical data signals 106 over a wireless optical link. The wireless optical link may be bi-directional. WD1 102 may include a transmitter 108, a first mirror 110, and a first controller 112. Similarly, WD2 104 may include a receiver 114, a second mirror 116, and a second controller 118. In various embodiments, the first mirror 110 and/or second mirror 116 may be MEMS mirrors. The MEMS mirrors may be substantially small, such as about 1 square millimeter.

Figure 3:
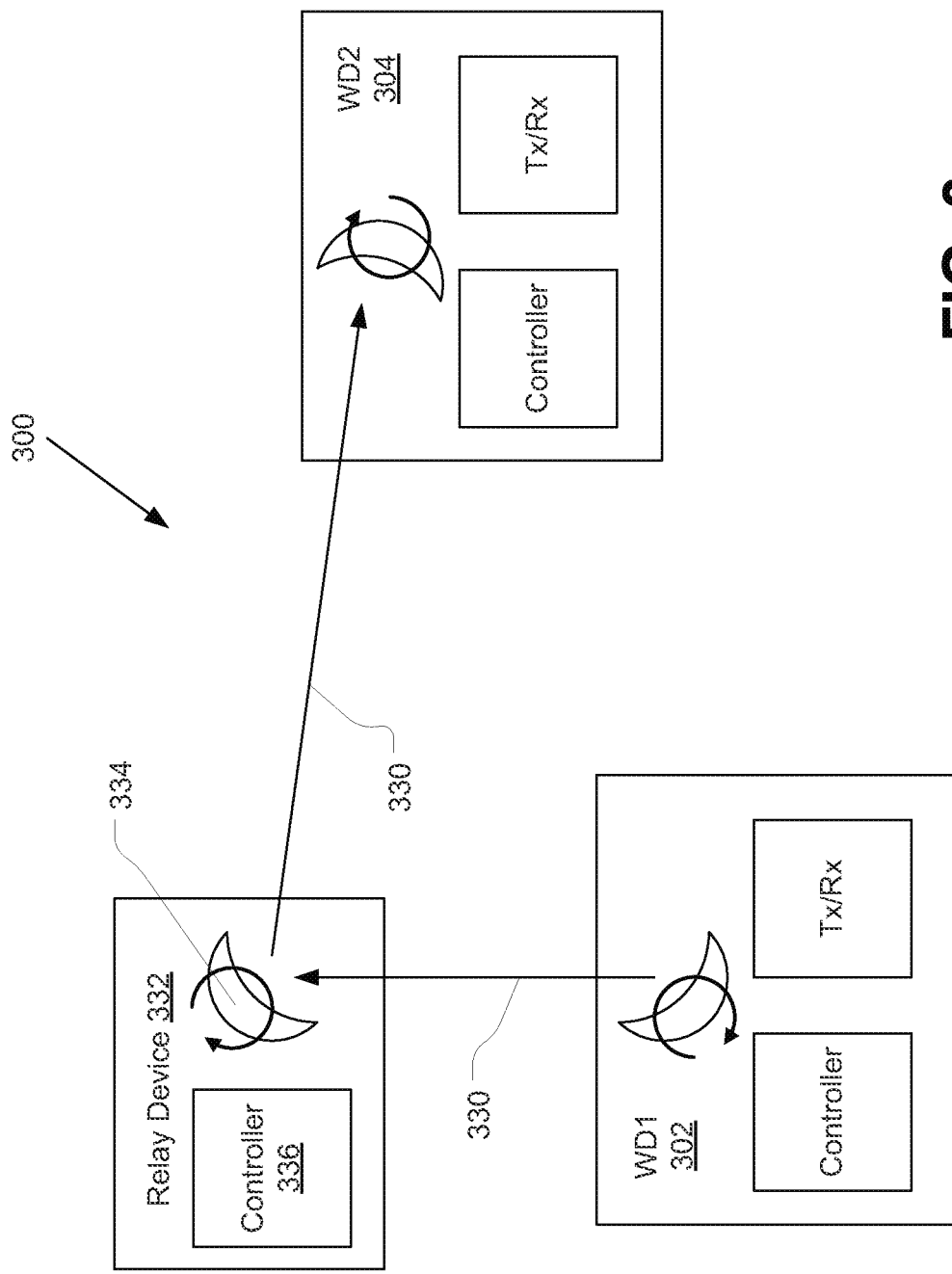
FIG. 3 illustrates a wireless communication system in which an wireless optical data signal from a first wireless communication device to a second wireless communication device is routed through a relay device.
Figure 4:
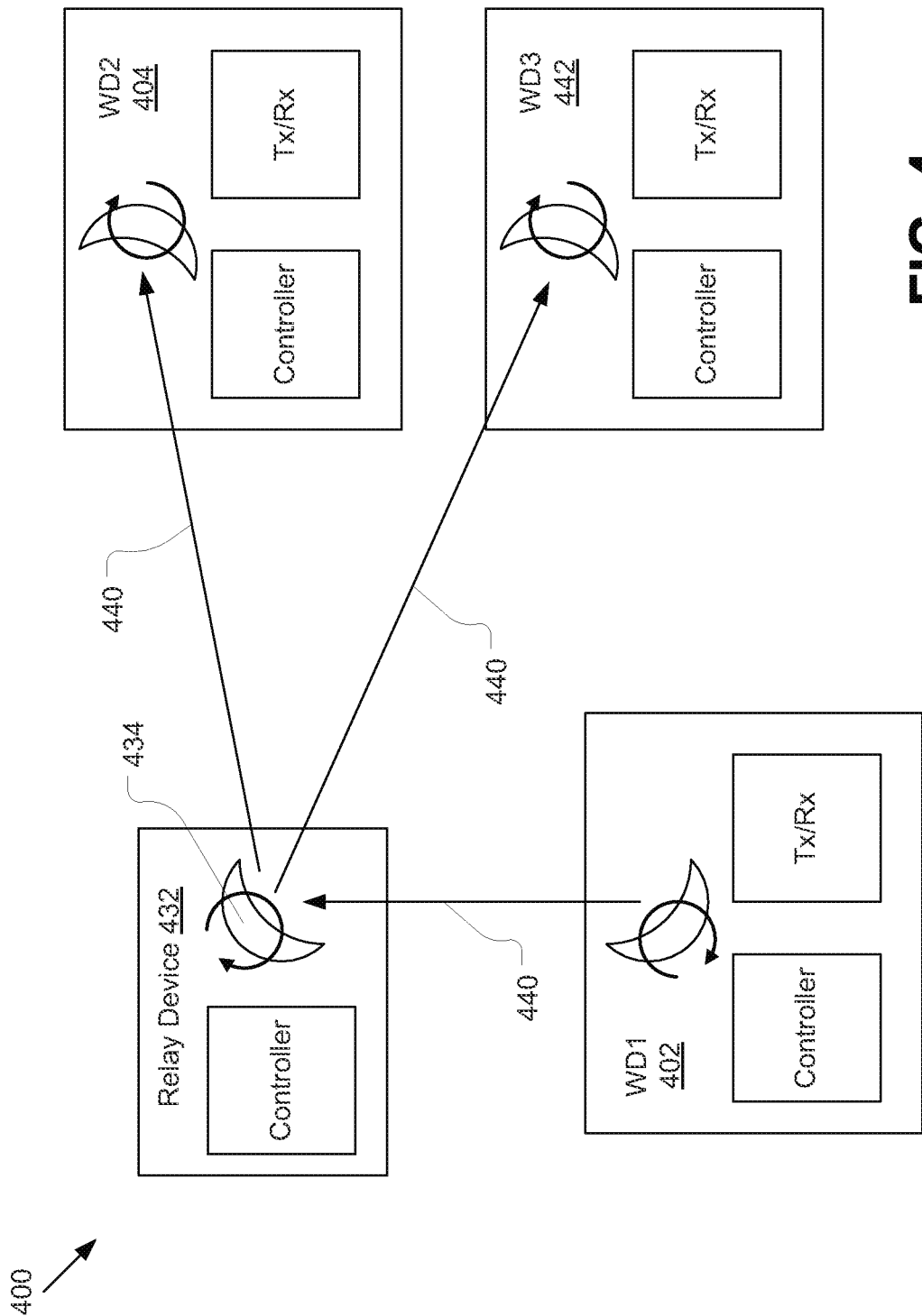
FIG. 4 illustrates a wireless communication system in which a first wireless communication device is configured to transmit a wireless optical data signal to a second wireless communication device and a third wireless communication device in accordance with various embodiments.

The first mirror 110 may direct optical data signals from the transmitter 108 to receiver 114 in WD2 104. The second mirror 116 may direct the optical data signals toward the receiver 114. The first controller 112 may move the first mirror and/or the second controller 118 may move the second mirror 116 to maintain the wireless optical link between WD1 102 and WD2 104. This may allow WD1 102 and WD2 104 to maintain the wireless optical link if WD1 102 and/or WD2 moves. The wireless optical link may be direct (as depicted in FIG. 1) and/or indirect (as depicted in FIG. 3 and FIG. 4 and discussed further below).

In some embodiments, WD 1 102 may also include a receiver 120 for receiving optical data signals over the wireless optical link. Similarly, WD2 104 may also include a transmitter 122 for transmitting optical data signals 106 over the wireless optical link 106. In other embodiments, one or more of WD1 102 and WD2 104 may only include transmit and/or receive capability over the wireless optical link 106.

In some embodiments, to initially set up the wireless optical link between WD1 102 and WD2 104, the controller 112 may control the first mirror 110 to hunt (e.g., scan) until transmitter 108 is able to send the data to the second mirror 116. The receiver 114 in WD2 104 may receive the signal from WD 1 102 and may identify WD 1 102 as legitimate (e.g., as a device suitable for communication with WD2 104 over the wireless optical link). WD2 104 may then send an acknowledgement message, using transmitter 122, to WD1 102. The controller 118 may move second mirror 116 as needed to send the acknowledgement to WD1 102. The first mirror 110 of WD1 102 may receive the acknowledgement message and send it to receiver 120 in WD 1. The controller 112 of WD1 102 may move the first mirror 110 for alignment with the second mirror 116. WD1 102 may determine that the acknowledgement message is legitimate and may tell controller 112 to lock first mirror 110 with second mirror 116 to facilitate further communication over the wireless optical link. In some embodiments, a portion or all of the set up procedure may be performed using another communication protocol, such as radio frequency (RF) communication.

For purposes of this disclosure, the term "optical" may refer to light in the visible and/or infrared spectrum. The visible spectrum may generally include light having a wavelength from about 380 nanometers (nm) to about 760 nm (e.g., a frequency of about 790 to about 400 TeraHertz (THz)). The infrared spectrum may generally include light having a wavelength from 760 nm to 300 micrometers (μm). In some embodiments, WD1 102 and WD2 104 may communicate in both the visible spectrum and the infrared spectrum. In other embodiments, WD1 102 and/or WD2 104 may communicate in only the visible spectrum or the infrared spectrum. In various embodiments, the strength and/or intensity of the wireless optical communication signal may be at a level that is safe for humans without significant health hazard.

For purposes of this disclosure, the term "communications structure" may include any device that is capable of transmitting and/or receiving optical data signals over a wireless optical link. Accordingly, the transmitter 108 and the receiver 114 may both be referred to as communications structures.

The transmitter 108 may include any suitable structure for sending optical data signals 106 over the wireless optical link. For example, the transmitter 108 may include an optoelectronic modulator, such as an LED, a tunable laser, and/or another light source adapted to produce an optical data signal 106 and transmit the optical data signal 106 over the wireless optical link. The transmitter 108 may include an up-converter to convert a baseband data signal to an optical carrier frequency of the optical data signal 106.

The receiver 114 may include any suitable structure for receiving optical data signals 106 over the wireless optical link. For example, the receiver 114 may include an optoelectronic demodulator, such as a photodiode. The receiver 114 may convert the optical data signal 106 into an electrical signal for further processing. The receiver 114 may further include a down-converter to convert the optical data signal 106 to baseband for processing.

In some embodiments, the first and second mirrors 110 and 116 may be capable of rotation about at least two axes (e.g., pitch and roll). In some embodiments, the first and second mirrors 110 and 116 may also be capable of rotation about a third axis (e.g., yaw). The first and second mirrors 110 and 116 may include any suitable structures and/or control systems for moving the respective mirror about the axes of rotation. For example, the mirror 110 and/or 116 may include a MEMS mirror balanced by a plurality of torsion springs (e.g., four torsion springs). The mirror may receive one or more control signals (e.g., voltages and/or currents) to control the torsion springs and thereby rotate/tilt the mirror. For example, in one embodiment the mirror may receive a set of four control signals. The control signals may be produced and/or provided by the respective controller 112 or 118. The amount of rotation of the mirror may depend on the value of the control signal(s). In some embodiments, the mirror may be independently controlled about the at least two axes.

In some embodiments, the transmitter 108 may be oriented with the first mirror 110 substantially surrounding the transmitter 108 to reflect the optical data signals 106 produced by the transmitter 108. For example, the transmitter 108 may be disposed in a middle portion of a concave surface of the first mirror 110. The first mirror 110 may act as a converging lens to focus the optical data signal in a particular direction. In some embodiments, the transmitter 108 may be physically coupled to the first mirror 110.

In some embodiments, the receiver 114 may be oriented with the second mirror 116 substantially surrounding the receiver 114. The second mirror 116 may focus incoming optical data signals toward the receiver 114. In some embodiments, the receiver 114 may be physically coupled to the second mirror 116.

In embodiments in which WD1 102 includes both a transmitter 108 and a receiver 120, the transmitter 108 and receiver 120 may use the same mirror (e.g., first mirror 110) and/or different mirrors for communication over the wireless optical link 106. Additionally, in some embodiments, the transmitter 108 and/or receiver 120 may be configured to use more than one mirror for communication (e.g., to transmit the optical data signal 106 to a plurality of devices). Alternatively, or additionally, the first mirror 110 may include a plurality of incongruent surfaces to allow the optical data signal to be directed in more than one direction. In some embodiments, WD1 102 and/or WD2 104 may include a plurality of transmitters and/or receivers and/or a plurality of mirrors 110 and/or 116.

As discussed above, WD1 102 and WD2 104 may be configured to maintain the wireless optical link 106 if WD1 102 and/or WD2 104 moves (e.g., changes location and/or orientation). The first controller 112 may move the first mirror 110 and/or the second controller 118 may move the second mirror 116 to maintain the wireless optical link 106 between the transmitter 108 and receiver 114.

In some embodiments, the wireless optical link may be initially formed by pointing the transmitter 108 and/or first mirror 110 of WD1 102 toward the receiver 114 and/or second mirror 116 of WD2 104. In other embodiments, the wireless optical link may be initially facilitated using another communications protocol, such as RF communication (e.g., WiFi). The first controller 112 and/or second controller 118 may maintain the wireless optical link by moving the respective mirror 110 or 116 based on feedback information. In some embodiments, the first controller 112 and second controller 118 may use a proportional-integral-derivative (PID) control system to keep the first mirror 110 and second mirror 116, respectively, locked on to one another.

In some embodiments, the feedback information may include a received signal strength indicator (RSSI) related to the optical data signals received by WD2 104. WD2 104 may adjust the position of the second mirror 116 (e.g., using PID control) to maintain a high received signal strength. In some embodiments, the feedback information may include a unique identifier(s) for WD1 and/or WD2, so that WD1 and WD2 may recognize each other as friendly devices. In this particular case, a rogue device that may come in the range of WD1 and WD2 may be prevented from being considered as a friendly device. The information exchange between WD1 and WD2 may also contain information transmitted over secure protocol or encrypted with a security key to maintain the data transfer secure. In some embodiments, the transfer of data signals between the devices may not take place unless WD1 102 and WD2 104 complete the recognition process, thereby authenticating each other as friendly devices.

In some embodiments, the transmitting device (e.g., WD1 102) may receive feedback information from the receiving device (e.g., WD2 104) to enable the transmitting device to move its respective mirror to maintain the wireless optical link. For example, WD2 104 may transmit feedback information related to the received signal, such as RSSI, to WD1 102. The first controller 112 of WD1 102 may use the feedback information to move the first mirror 110 to maintain the wireless optical link 106 (e.g., according to the PID control protocol). In some embodiments, WD1 102 may receive the feedback information from WD2 104 via the wireless optical link (e.g., via a feedback channel). In other embodiments, WD1 102 may receive the feedback information from WD2 104 via a different communication protocol, such as an RF communication.

Alternatively, or additionally, the transmitting device (e.g., WD1 102) may generate its own feedback information. For example, WD1 102 may remember the location of WD2 104 and move the first mirror 110 in response to movement of WD1 102. This may be suitable, for example, if WD2 104 is substantially stationary. In some embodiments, WD1 102 may include component to track relative movement and provide feedback information to the first controller 112, such as an accelerometer and/or gyroscope.

WD1 102 and/or WD2 104 may be any suitable devices configured to communicate over the wireless optical link, such as a tablet computer, laptop computer, desktop computer, storage device, smartphone, networking device, printer, active or passive sensor, actuator, camera, camcorder, gaming device, media player, musical instrument, appliance, and/or other suitable device. WD1 102 and WD2 104 may generally be located in relatively close proximity to one another, such as within about one hundred feet from one another. For example, WD1 102 and WD2 104 may be located in the same room and/or adjoining rooms. In some embodiments, WD1 102 and WD2 104 may be disparate components of the same device (e.g., different components of a multi-chip package and/or a silicon package).

The wireless optical link may be used to transmit any suitable data between devices, such as media (e.g., pictures, video and/or audio), computing files (e.g., for transfer between devices and/or archiving), data related to an ongoing computing session, and/or sensor data. For example, the wireless optical link may be used to play media stored on WD1 102 on a display and/or speaker(s) of WD2 104. Additionally, the wireless optical link may be used to facilitate a user of WD1 102 to transfer an ongoing computing session to WD2 104.

The wireless optical link may allow substantially high data rates (e.g., several tens to hundreds of Gigabits per second (Gbps) or more) and/or transfer of large amounts of data. In some embodiments, a plurality of channels may be included in the wireless optical link. The optical frequency band may allow a large number of channels to be included, with narrowband filters used to separate the channels. Alternatively, or additionally, multiple channels may be included in an optical signal of the same frequency using different phases and/or polarization to separate the channels. Optical light is highly directional with low dispersion, which may provide increased power efficiency compared with radio frequency (RF) communication. Additionally, the directional nature of optical light may make it difficult for an unintended device to intercept the communication, thereby providing secure communications. Furthermore, in some embodiments, the large number of channels may allow the transmitter to use a unique frequency from other transmitters, thereby reducing the likelihood of signal interception and increasing security. The channels may be dynamically scanned, selected, and/or changed at pre-defined intervals based on specific understanding between the WD1 and WD2. The optical data signals may be low power, such as about a few milliWatt (mW).

Figure 2:
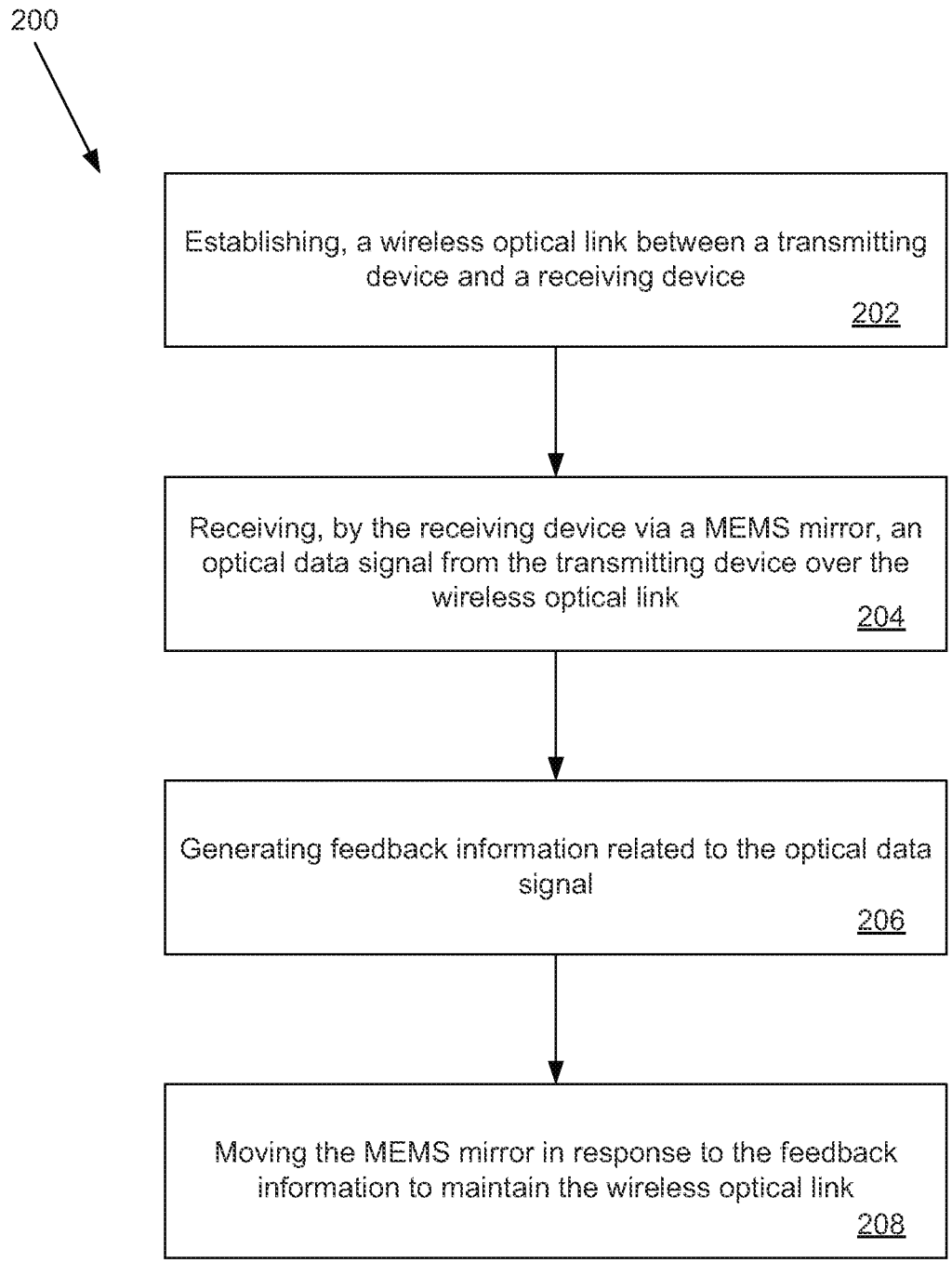
FIG. 2 illustrates a method of establishing and maintaining a wireless optical link between wireless communication devices in accordance with various embodiments.

FIG. 2 illustrates a method 200 for establishing and maintaining a wireless optical link in accordance with various embodiments. At 202, a transmitting device (e.g., WD1 102 of FIG. 1) may establish a wireless optical link with a receiving device (e.g., WD2 104 of FIG. 1). As discussed above, the wireless optical link may be accomplished by pointing a transmitter (and/or a communications module including the transmitter, a mirror and a controller) of the transmitting device toward a receiver (and/or a communications module including the receiver, a mirror and a controller) of the receiving device and sending an optical signal from the transmitter to the receiver. In some embodiments, establishing the wireless optical link may include a handshake process involving a request by the transmitting device to communicate with the receiving device (or vice versa) via a wireless optical link, a response to the request sent from the receiving device back to the transmitting device, and/or a confirmation of the response sent from the transmitting device to the receiving device. The handshake process may include an exchange of one or more parameters to be used for communication over the wireless optical link, such as particular channel(s) to use, modulation and coding scheme, data rate, and/or other parameters. In some embodiments, another communication protocol, such as an RF communication protocol, may be used to facilitate establishing the wireless optical link.

At 204, the receiving device may receive an optical data signal from the transmitting device over the wireless optical link. The receiver of the receiving device may receive the optical data signal via the mirror of the receiving device.

At 206, the receiving device may generate feedback information related to the optical data signal. The feedback information may include one or more indicators, such as RSSI.

At 208, the receiving device may move one or more of its mirrors in response to the feedback information to maintain the wireless optical link. The mirror may be controlled to move about at least two axes (e.g., pitch and roll). In some embodiments, the receiving device may move the mirror using PID control, as discussed above. The mirror of the receiving device may thus remain locked on the mirror of the transmitting device to maintain the wireless optical link if one or both devices move.

The transmitting device may also move its mirror to maintain the wireless optical link. In some embodiments, the receiving device may also transmit feedback information to the second communications device. The transmitting device may use the feedback information to adjust the mirror of the transmitting device to maintain the wireless optical link.

In some embodiments, the wireless optical link between wireless communication devices may be routed through one or more relay devices. Accordingly, wireless optical data signals transmitted over the wireless optical link may follow a direct and/or indirect path from the transmitting device to the receiving device. FIG. 3 illustrates a wireless communication system 300 in which an optical data signal 330 is transmitted from a first wireless communication device (WD1) 302 to a second wireless communication device (WD2) 304 via a relay device 332. In some embodiments, the relay device 332 may be in a fixed location, such as on a wall and/or ceiling. The relay device 332 may be used to form the wireless optical link between WD1 302 and WD2 304, for example, if a direct line of sight between WD1 302 and WD2 304 is unavailable (e.g., if a wall and/or other obstruction is disposed between WD1 302 and WD2 304). In some embodiments, the initial alignment between WD1 and WD2, with or without using relay device 332, may be achieved through another suitable means, such as using RF wireless communication, while the actual data transfer may use optical wireless communication.

The relay device 332 may include one or more mirrors 334 and a controller 336. The mirror(s) 334 may receive a wireless optical data signal from WD1 302 and direct the optical data signal to WD2 304. In some embodiments, the optical data signal may be routed through a plurality of relay devices including the relay device 332 prior to arriving at WD2 304. The controller 336 of the relay device 332 may be coupled to the mirror(s) 334 and may move the mirror 334 in response to feedback information to maintain the wireless optical link 330.

In some embodiments, WD2 304 may also transmit optical data signals to WD1 302 via the relay device 332. The relay device 332 may use the same and/or different mirror(s) to forward optical data signals from WD2 304 to WD1 302 as those used to forward optical data signals from WD1 302 to WD2 304.

In some embodiments, the relay device 332 may receive the feedback information from WD1 302 and/or WD2 304. The relay device 332 may receive the feedback information via the wireless optical link 330 and/or via a different communication protocol. In these embodiments, the relay device 332 may include a receiver to receive the feedback information.

In some embodiments, the relay device 332 may receive the feedback information from WD2 304 and may forward the feedback information to WD1 302 for use by WD1 302 to maintain the wireless optical link 330 as described herein. The feedback information may be forwarded to WD1 302 via the wireless optical link and/or via a different communication protocol.

In some embodiments, WD1 302 and/or WD2 304 may store, receive, and/or generate location information related to a location of the relay device 332. Additionally, in some embodiments, the relay device 332 may store, receive, and/or generate location information related to the locations of WD1 302 and/or WD2 304. The location information may be used to facilitate establishing and/or maintaining the wireless optical link. For example, WD1 302 may use the location information to direct wireless data signals toward the relay device 332 for forwarding to WD2 304. WD2 304 may use the location to generate and/or transmit feedback information to be used by the relay device 332 and/or WD1 302.

In some embodiments, the transmitting device may send a wireless optical data signal to a plurality of receiving devices. For example, FIG. 4 illustrates a wireless communication system 400 in which a first wireless communication device WD1 402 is configured to transmit an optical data signal 440 to a second wireless communication device WD2 404 and a third wireless communication device (WD3) 442. The optical data signal 440 may be routed through a relay device 432. In other embodiments, WD1 402 may send the optical data signal 440 directly to WD2 404 and WD3 442. In some embodiments, the initial linkage(s) between WD1 with WD2 and WD3 via relay device 432 may be established using RF wireless communication.

The relay device 432 may use one or more mirrors 434 and/or another suitable structure to split the optical data signal 440 into two optical data signals 440 and direct the optical data signal 440 to WD2 404 and WD3 442. In some embodiments, the mirror 434 may include a plurality of incongruent surfaces to split the optical data signal 440 and/or direct the optical data signal 440 in different directions.

In some embodiments, the optical data signal 440 may include one or more identifiers, such as a transmitting device identifier to identify the transmitting device (e.g., WD1 402) and/or one or more receiving device identifiers to identify the intended recipient(s) of the optical data signal (e.g., WD2 404 and/or WD3 442). The relay device 432 may use the receiving device identifier(s) to route the optical data signal 440 to the intended recipient device(s). For example, the optical data signal 440 may include a preamble portion and a body portion. The identifier(s) may be included in the preamble portion of the optical data signal 440 to be processed by the relay device 432. The relay device 432 may then forward the body portion of the optical data signal 440 to the intended recipient device(s).

In some embodiments, the relay device 432 may be a wireless communication device that is also configured to transmit and/or receive over the wireless optical network. That is, the wireless communication device may be used as a relay device to route optical data signals between two other wireless communication devices.

Figure 5:
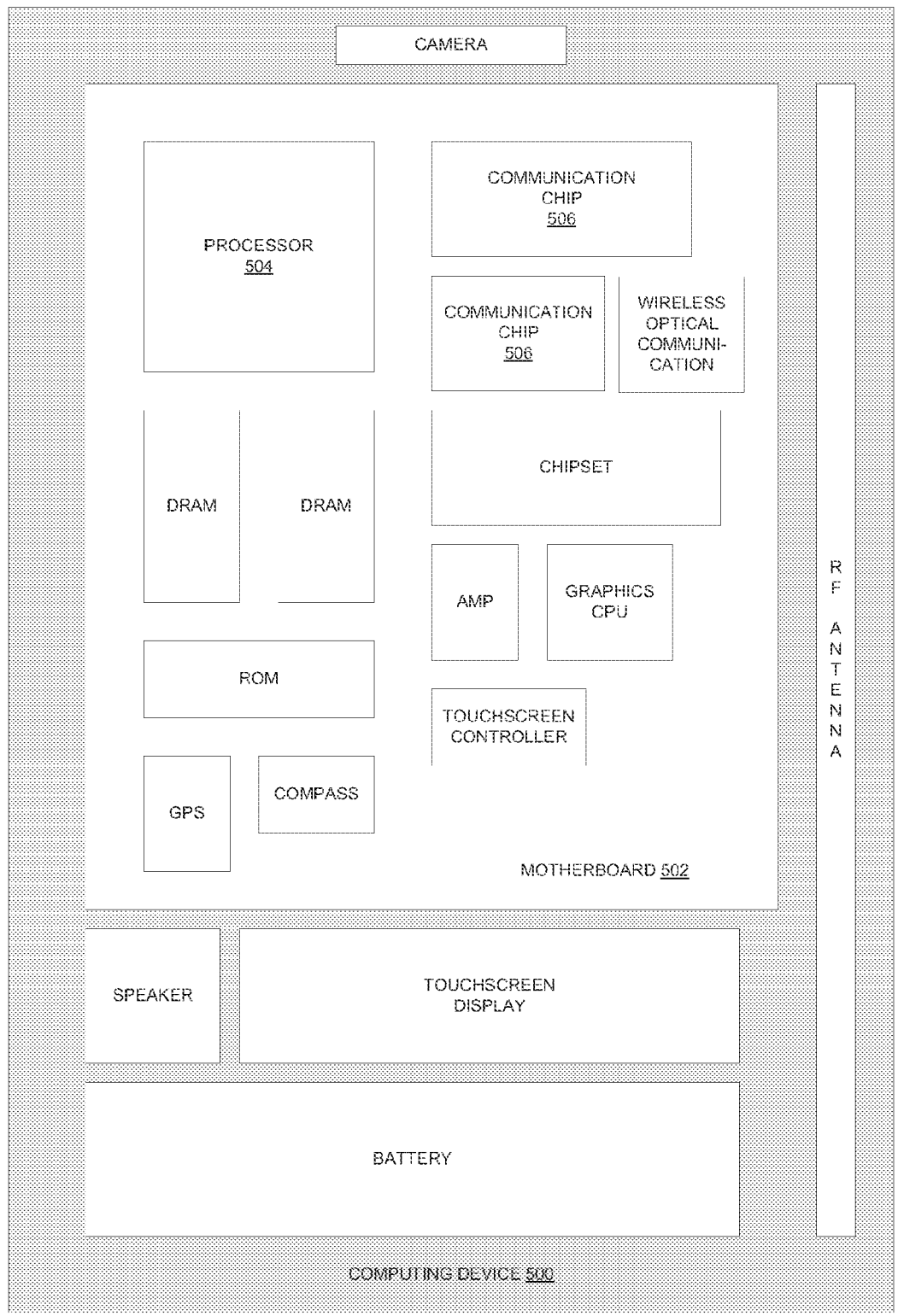
FIG. 5 illustrates an example computing system suitable for practicing the disclosed embodiments.

FIG. 5 illustrates a computing device 500 in accordance with one implementation of the invention. The computing device 500 houses a board 502. The board 502 may include a number of components, including but not limited to a processor 504 and at least one communication chip 506. The processor 504 is physically and electrically coupled to the board 502. In some implementations the at least one communication chip 506 is also physically and electrically coupled to the board 502. In further implementations, the communication chip 506 is part of the processor 504.

Depending on its applications, computing device 500 may include other components that may or may not be physically and electrically coupled to the board 502. These other components may include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, other suitable sensors (e.g., an accelerometer and/or an ambient light sensor (ALS)), a speaker, a camera, and a mass storage device (such as hard disk drive, compact disk (CD), digital versatile disk (DVD), a wireless (RF and/or optical) subsystem, security subsystem, power management system, and so forth).

The communication chip 506 enables wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to wireless optical communication as described herein, Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 2G, 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

In accordance with various embodiments, the communication chip 506 may include and/or interface with an optical communication module to communicate over a wireless optical link as described herein. The optical communication module may include a processor, one or more communications structures (e.g., transmitter and/or receiver), and one or more mirrors (e.g., MEMS mirrors) as described herein. The optical communications module may be included entirely or partially in communication chip 506 and/or may be included in other component(s) of the computing device 500. The optical communication module may be used to communicate with other computing devices and/or with other component(s) of the computing device 500 over the wireless optical link.

The processor 504 of the computing device 500 includes an integrated circuit die packaged within the processor 504. In accordance with an implementation of the disclosed embodiments, the integrated circuit die of the processor 504 includes one or more devices, such as transistors or metal interconnects, that are formed in accordance with implementations of the disclosed embodiments. The term "processor" may refer to any device or portion of a device that processes electronic data from registers and/or memory to transform that electronic data into other electronic data that may be stored in registers and/or memory.

The communication chip 506 also includes an integrated circuit die packaged within the communication chip 506. In accordance with an implementation of the disclosed embodiments, the integrated circuit die of the communication chip includes one or more devices, such as transistors or metal interconnects, that are formed in accordance with implementations of the disclosed embodiments. The communication chip 506 may include a photodiode, a laser device, LED or any other similar device for transmitting and/or receiving a wireless optical signal. The chip may be on the motherboard 502 or may be housed in the mirror assembly.

In further implementations, another component housed within the computing device 500 may contain an integrated circuit die that includes one or more devices, such as transistors or metal interconnects, that are formed in accordance with implementations of the invention.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, a digital video recorder, a data storage device a sensor, an instrument, and/or an appliance. In further implementations, the computing device 500 may be any other electronic device that processes data.

Although various example methods, apparatus, systems, and articles of manufacture have been described herein, the scope of coverage of the present disclosure is not limited thereto. On the contrary, the present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. An apparatus, comprising:
    a first communications structure to communicate with a second communications structure of another apparatus via a wireless optical link;
    a micro-electro-mechanical systems (MEMS) mirror coupled with the first communication structure to direct an optical data signal sent over the wireless optical link;
    a tracking component coupled with the first communication structure to track relative movement of the apparatus and the other apparatus; and
    a controller coupled with the tracking component to move the MEMS mirror based on feedback information to maintain the optical link between the first communications structure and the second communications structure, in response to a receipt of the feedback information provided by the tracking component and indicating the relative movement of the apparatus and the other apparatus.

2. The apparatus of claim 1, wherein the MEMS mirror is to rotate about at least two axes.

3. The apparatus of claim 1, wherein the first communications structure comprises an optoelectronic modulator to transmit the optical data signal, and wherein the controller is to move the MEMS mirror to direct the optical data signal to a receiver of the second communications structure, wherein the optoelectronic modulator includes one or more light emitting diodes (LEDs).

4. The apparatus of claim 3, wherein the first communications structure is to transmit the optical data signal to a plurality of communications structures.

5. The apparatus of claim 1, wherein the first communications structure comprises an optoelectronic demodulator to receive the optical data signal from the second communications structure via the wireless optical link, and wherein the controller is to move the MEMS mirror to direct the optical data signal toward the optoelectronic demodulator, wherein the optoelectronic demodulator includes one or more photodiodes.

6. The apparatus of claim 1, wherein the feedback information includes a received signal strength indicator related to the optical data signal.

7. The apparatus of claim 1, wherein the feedback information is received by the controller from the second communications structure, wherein the feedback information includes a unique identifier associated with the second communications structure for authenticating the second communications structure.

8. The apparatus of claim 1, wherein the controller includes a proportional-integral-derivative (PID) controller to move the MEMS mirror based on the feedback information.

9. The apparatus of claim 1, wherein the MEMS minor is a first MEMS mirror and the controller is a first controller, wherein the data signal transmitted via the wireless optical link is routed through a relay device, and wherein the relay device includes:
  a second MEMS mirror to direct the optical data signal between the first and second communications structures communicating over the wireless optical link;
  a second controller to move the second MEMS mirror in response to fee back from at least one of the first and second communications structures communicating over the wireless optical link.

10. The apparatus of claim 1, wherein the second communications structure is remotely disposed from the first communications structure.

11. A method comprising:
  establishing, by a first communications device, a wireless optical link with a second communications device;
  receiving, by the first device via a micro-electro-mechanical systems (MEMS) minor, an optical data signal in the visible and/or infrared spectrum from the second communications device over the wireless optical link;
  tracking, by the first communications device, relative movement of the first and second communication devices;
  generating, by the first communications device, feedback information regarding the data signal, the feedback information indicating the relative movement of the first and second communications devices; and
  moving the MEMS mirror in response to the feedback information to maintain the wireless optical link.

12. The method of claim 11, further comprising sending, to the second communications device, the feedback information to enable the second communications device to maintain the wireless optical link with the first communications device.

13. The method of claim 11, wherein the optical data signal is received via a relay device having a relay mirror.

14. The method of claim 13, further comprising sending, to the relay device, the feedback information, wherein the relay device is to move the relay mirror in response to the feedback information to maintain the wireless optical link between the first and second communications devices.

15. The method of claim 11, wherein the moving comprises rotating the MEMS mirror about at least two axes.

16. A relay device, comprising:
  a mirror to receive a wireless optical data signal from a transmitter of a first communications device, and direct the optical data signal to a receiver of a second communications device to form a wireless optical link between the first and second communications devices;
  a receiver coupled with the mirror to receive feedback information from the first or second communications device via the wireless optical link, to indicate relative movement of the first and second communications devices; and
  a controller coupled with the mirror to move the mirror in response to the feedback information, to maintain the wireless optical link.

17. The relay device of claim 16, wherein the controller is to receive the feedback information from the second communications device and to forward the feedback information to the first communications device.

18. The relay device of claim 16, wherein the mirror comprises a first mirror and the relay device further comprising a plurality of mirrors including the first mirror.

19. The relay device of claim 16, wherein the relay device is to direct the optical data signal to a plurality of communications devices including the second communications device.

20. A system, comprising:
  a processor associated with a first communications device;
  a communications module coupled to the processor, the communications module including:
    a first transmitter to transmit optical data signals to a second communications device over a wireless optical link;
    a first receiver to receive optical data signals from the second communications device over the wireless optical link;
    a tracking component coupled to track relative movement of the first and second communications devices;
    one or more micro-electro-mechanical systems (MEMS) mirrors, at least one of the MEMS mirrors to direct optical data signals from the first transmitter to a second receiver, and at least one of the MEMS mirrors to direct received optical data signals to the receiver; and
    a controller coupled with the tracking component and the MEMS mirrors to move the one or more MEMS mirrors in response to feedback information to maintain the wireless optical link, in response to a receipt of the feedback information provided by the tracking component and indicating the relative movement of the first and second communications devices; and
  a display coupled to the processor.

21. The computing system of claim 20, wherein the received optical data signals include image data related to an image to he shown on the display.

22. The computing system of claim 20, wherein the display comprises a first display, wherein the processor, the communications module and the display are included in the first communications device, and wherein the transmitter is to transmit, via the wireless optical link, optical data signals to the second communications device having a second display, the optical data signals including image data related to an image to be shown on the second display.

23. The computing system of claim 20, wherein the controller includes a proportional-integral-derivative (PID) controller to move the one or more MEMS mirrors based on the feedback information.

24. The computing system of claim 20, wherein at least one of the one or more mirrors is to direct transmitted signals from the first transmitter and to direct received signals to the first receiver.

25. The computing system of claim 20, wherein the one or more mirrors include a first mirror for directing transmitted optical data signals from the first transmitter and a second mirror for directing received optical data signals to the first receiver, the second mirror being different from the first mirror.

* * * * *